UNITED STATES PATENT OFFICE 2,435,553

DIMERIC OCTADECADIENONITRILE

Herman A. Bruson and Warren D. Niederhauser, Philadelphia, Pa., assignors to The Resinous Products & Chemical Company, Philadelphia, Pa., a corporation of Delaware No Drawing. Application May 5, 1945, Serial No. 592,264

1 Claim. (Cl. 260—464)

This invention relates to the dimer of octadecadienonitrile and to a method for its preparation.

Conversion of carboxylic acids with ammonia through the ammonium salt and amide to the nitrile is known. Furthermore, it has been reported that at elevated temperatures long-chained nitriles are cracked to shorter-chained nitriles.

In contrast thereto and according to this invention octadecadienoic acid, such as is obtained from the thermal catalytic dehydration of castor oil, is converted directly to the dimerized nitrile by acting upon the octadecadienoic acid with ammonia gas at a temperature between about 280° and about 400° C. until no more water is evolved.

The formation of the dimeric nitrile takes place readily but is catalyzed by the presence of small amounts (0.5%–1%) of stable oxide catalysts, such as the oxides of aluminum, thorium, and zirconium. Other oxides which do not readily form soaps with fatty acids may likewise be used or mixtures of such oxides.

The technical octadecadienoic acid available for the purpose of this invention contains a mixture of isomeric $C_{18}$ doubly unsaturated fatty acids, consisting essentially of

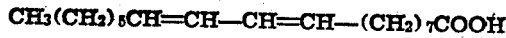

9,11-octadecadienic acid and

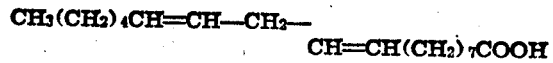

9,12-octadecadienic acid together with smaller amounts of other long chain unsaturated fatty acids.

The process is advantageously carried out by heating an octadecadienoic acid in a suitable vessel, such as one made of stainless steel or glass coated steel, and passing a current of ammonia gas through the hot liquid as the temperature is raised and maintained between about 280° and about 400° C., preferably 280° C. to 360° C. The vessel is desirably fitted with a stirrer and a short, air-cooled condenser so arranged that the water which is formed is carried off in the current of ammonia. The heating and passage of the ammonia is continued until no more water is evolved, usually a matter of several hours, and dimerization is essentially complete. The liquid reaction product obtained consists chiefly of polymerized octadecadienonitrile, constituting from 70%–78% of the material present. By distilaltion in high vacuum in a molecular still, the dimeric octadecadienoic nitrile having the formula $C_{36}H_{62}N_2$ is obtained in 45%–60% of the theoretical yield as a pale yellow oil.

The following examples illustrate this invention, it being understood that the time of heating and the temperature can be varied considerably.

Example 1

A mixture of 407 grams of octadecadienoic acid, obtainable from the dehydration of castor oil and known under the trade name "Isoline fatty acid," and five grams of powdered alumina was stirred in a glass vessel fitted with a short, air-cooled condenser. The vessel was heated electrically. When the temperature of the acid reached 175° C., ammonia was passed through the liquid at a rate of one gram per minute. The reaction mixture was gradually heated over a period of two hours to 325° C. The rate of flow of ammona was then reduced to 0.5 gram per minute. The reaction mixture was stirred continuously and maintained at 325° C. for an additional three hours while the passage of ammonia was continued.

The product was distilled in high vacuum to yield 170 grams of dimeric octadecadienonitrile boiling at 210°–240° C. at 0.005 mm. pressure. This material was a pale yellow oil having the following constants: Refractive index, $N_D^{20}$, of 1.4881, and density, $d_4^{25}$, of 0.9131. Analytical data were determined as follows: N, 5.13%; molecular weight, 491; molecular refraction, 164.8, and iodine number, 118. These may be compared with the calculated values for $C_{36}H_{62}N_2$ of: N, 5.36%; molecular weight, 522; molecular refraction, 164.98, and iodine number of 97.

Example 2

A mixture of 403 grams of octadecadienoic acid and 12 grams of powdered zirconia was stirred and heated as described above. When the temperature reached 225° C., ammonia was bubbl: through the hot liquid at a rate of one gram per minute and the reaction mixture was gradually heated to 310° C. over a period of two hours. The rate of flow of ammonia was then reduced to 0.5 gram per minute. The reaction mixture was then held at 310°–320° C. for three hours longer while ammonia was continually introduced. The product was distilled in high vacuum through a molecular still to give 157 grams of dimeric octadecadienonitrile, $C_{36}H_{62}N_2$.

Dimeric octadecadienonitrile as obtained above is readily converted by alkaline hydrolysis into the corresponding $C_{36}$ dicarboxylic acid, which is a thick, dark oil.

Upon catalytic hydrogenation in the presence of finely divided nickel and in the presence of ammonia, dimeric octadecadienonitrile yields the corresponding $C_{36}$ diamine. It is a pale yellow liquid.

These materials are useful for preparing synthetic resins and plastics of the alkyd and polyamide type.

We claim:

As a new chemical product, dimeric octadecadienonitrile, said product when pure being a pale yellow oil having the formula $C_{36}H_{62}N_2$.

HERMAN A. BRUSON.
WARREN D. NIEDERHAUSER.

REFERENCES CITED

The following references are of record in the file of this patent:

UNITED STATES PATENTS

| Number | Name | Date |
|---|---|---|
| 2,037,389 | Nicodemus et al. | Apr. 14, 1936 |
| 2,177,619 | Nicodemus et al. | Oct. 24, 1939 |
| 2,061,314 | Ralston et al. | Nov. 17, 1936 |

FOREIGN PATENTS

| Number | Country | Date |
|---|---|---|
| 609,996 | Germany | July 31, 1936 |